Patented June 18, 1946

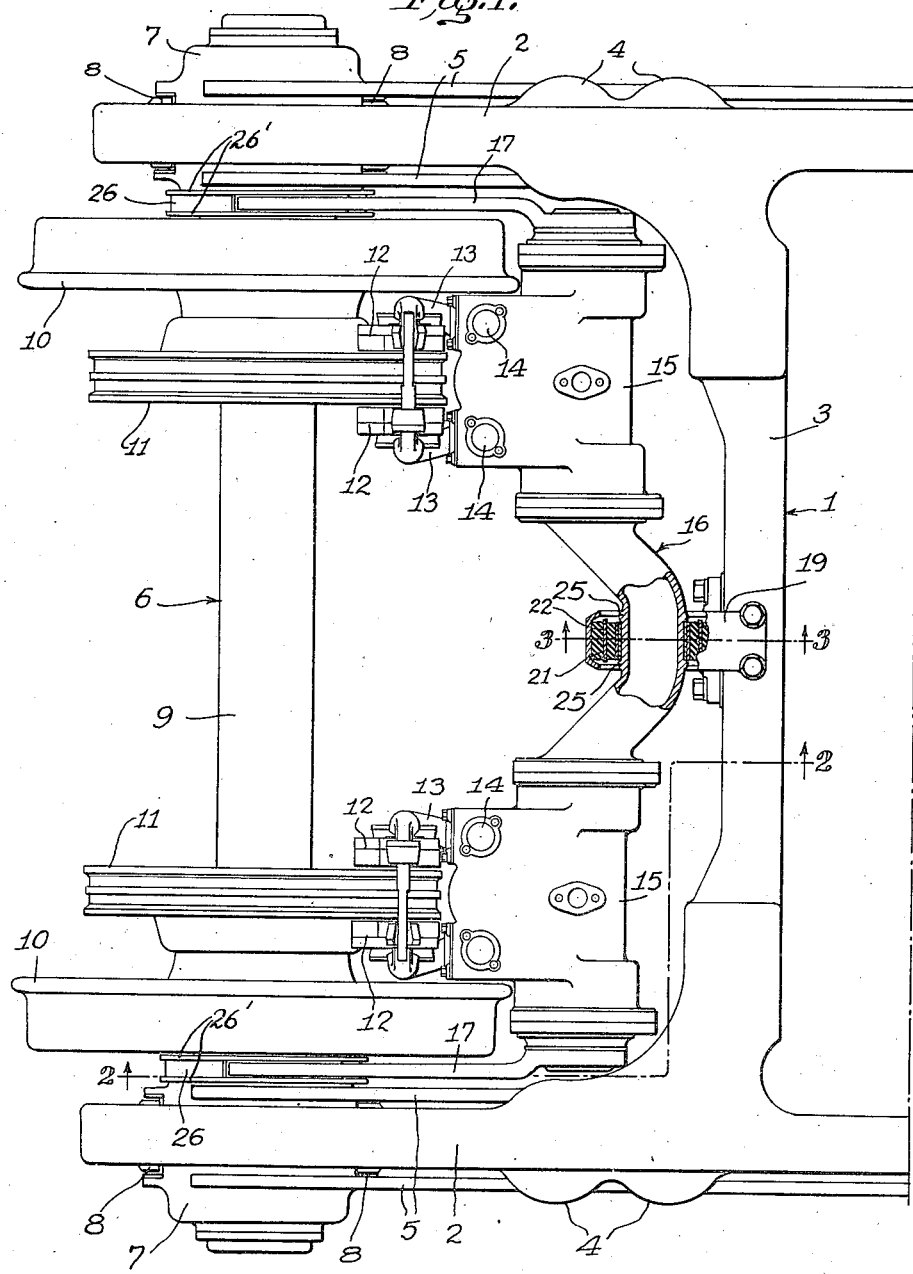

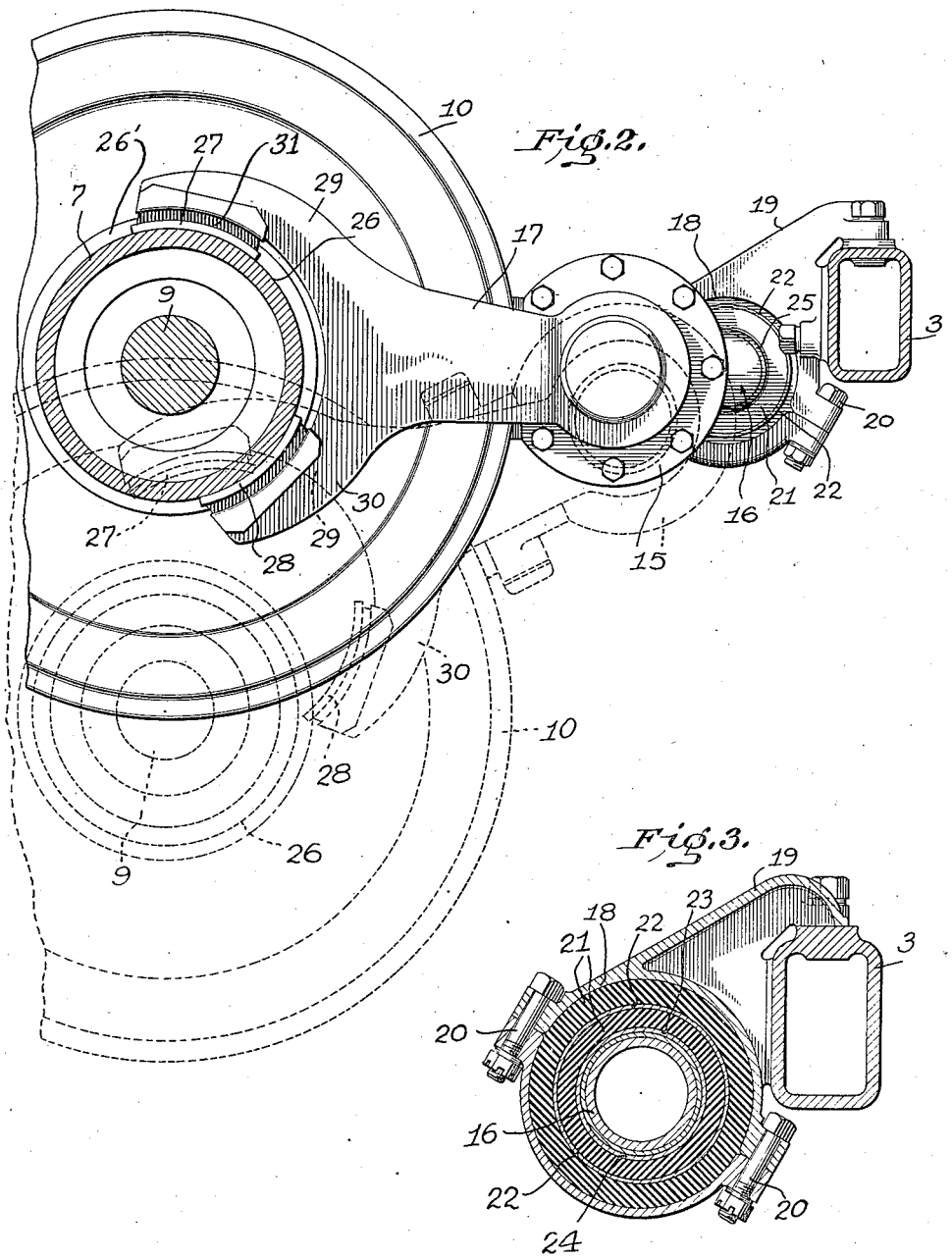

2,402,489

UNITED STATES PATENT OFFICE 2,402,489

BRAKE ARRANGEMENT

Carolus L. Eksergian, Detroit, Mich., assignor to Budd Wheel Company, Philadelphia, Pa., a corporation of Pennsylvania Application January 8, 1945, Serial No. 571,733

8 Claims. (Cl. 188—59)

The invention relates to a brake mechanism and particularly to such a mechanism applied to vehicles, such as railway trucks.

The invention is particularly concerned with the type of brake mechanism in which the brake stators and their actuating means are carried by a U or C shaped support, supported by the adjacent wheel and axle assembly and the truck frame, such as is disclosed in copending application, Serial No. 399,779 for Brake mechanism, filed June 26, 1941.

The present invention is particularly concerned with the simplification of the support of the U or C shaped brake support from the wheel and axle assembly so as to permit the automatic disengagement of the brake support from the wheel and axle assembly upon dropping the wheel and axle assembly from the vehicle frame.

Other and further objects and advantages and the manner in which they are attained will become apparent from the following detailed description when read in connection with the drawings forming a part of this specification.

In the drawings:

Fig. 1 is a plan view of one-half of a railway truck showing the invention applied thereto, parts being broken away and shown in section;

Fig. 2 is a sectional view on an enlarged scale, the section being taken along a longitudinal vertical plane substantially as indicated by the section line 2—2 of Fig. 1, showing the normal position of the parts in full lines, and in dotted lines showing the position the brake support automatically assumes as the wheel and axle assembly is moved to the dotted line position shown.

Fig. 3 is an enlarged sectional view of the pivotal bearing of the brake support on the truck frame, the section being taken approximately on the line 3—3 of Fig. 1;

In the embodiment selected for illustration, the truck frame is designated generally by the reference numeral 1 and comprises the usual longitudinally extending side members 2, 2 interconnected by transoms, as 3. The frame is resiliently supported by spring nests indicated at 4 from the usual equalizers 5, 5 which are in turn supported at their ends by the wheel and axle assemblies, the one shown being designated generally by the numeral 6. The ends of the equalizers rest on top of the usual journal boxes 7, 7 of said assembly, which are guided with respect to the side members of the frame for relative vertical movement by the usual pedestal guides, as 8, 8. The wheel and axle assembly also comprises an axle 9, wheels 10, 10, and in this instance the brake rotors or discs 11, 11, one secured to rotate with each wheel of the assembly.

When it is desired to remove a wheel and axle assembly from the truck frame and equalizers, the equalizers may be jacked up and the wheel and axle assembly thus in effect drops away from the other parts of the truck, being guided in this movement by the pedestal guides 8, 8.

Brake stators in the form of arcuate segmental brake shoes 12, 12 are arranged in cooperative relation to the opposite faces of the respective discs 11. These shoes are pivotally carried by respective brake levers 13, 13 pivoted at 14, 14 in the cylinder housing 15 carrying the actuator cylinder for actuating the levers to apply the brakes.

In the form shown, the cylinder housings form parts of a generally U or C shaped brake support including a transversely extending portion designated as 16 from adjacent each end of which extend the longitudinal arms, as 17.

The central offset portion of the transverse member 16 is pivotally carried in a bearing from the transom 3 of the truck frame. The outer member of this bearing comprises a split casing designated 18 carried by a bracket 19 bolted to the transom 3 and having its two parts clamped together by the bolts 20. This bearing is preferably cushioned by a relatively thick annulus of rubber designated generally 21, the rubber being divided as shown, into several annuli, spaced by a metal ring 22. Inside the inner of these rubber annuli is secured an outer bearing bushing 23 rotatable upon an inner bearing bushing 24 secured between ribs 25 formed on the member 16. Thus the rubber annulus 21 not only cushions the rotative vertical and longitudinal movements of the parts but also their relative transverse or tilting movements. At the same time the transverse member 16 is free to rotate through the interengaging bearing bushings 23 and 24 without stressing the rubber in this rotary movement. The purpose of this freedom will become apparent as the description proceeds.

The rubber cushion at this point is made with a relatively large mass of rubber to secure adequate cushioning action since most of the weight of the brake support is carried by the bearing.

The arms 17 are pivotally supported on the wheel and axle assembly so as to allow the dropping away of said assembly to automatically disconnect the brake support from the assembly.

Such pivotal support comprises an outside bearing, as 26 disposed between annular shoulders 26' and carried by the inner end of each journal box and spaced cooperating arcuate segmental bearing plates 27 and 28 secured, respectively, to the end portions of forked upper and lower extensions 29 and 30 of the arm 17. The extensions 29 and 30 are of different lengths, the lower arm 30 being the shorter, and the bearing plate 27 carried by the upper arm being disposed substantially vertically above the axle of the assembly while the lower plate 28 is disposed below a horizontal plane through the axle and to one side, that is, toward the adjacent transom, of the vertical plane through the axle. The centers of the spaced bearings are disposed substantially less than 180° apart, in the neighborhood of 120°. Their distance apart is so chosen that an adequate bearing support is had upon the adjacent journal box and yet they are not far enough apart to prevent the dropping away of the wheel and axle assembly and the automatic disengagement of the bearings upon such dropping away, as shown in the dotted lines in Fig. 2. By reason of the free rotation between bearing bushings 23 and 24 the brake support is readily swung about this pivotal connection to the frame, when the wheel and axle assembly is dropped away.

Suitable means may be provided, not shown herein, for preventing excessive downward swing of the brake support about its pivotal connection to the frame.

Each of the arcuate segmental bearing plates 27 and 28 is preferably cushioned by an arcuate rubber cushion, as 31, which is suitably secured as by vulcanization to the respective plate and its associated forked extension. These rubber cushions permit slight lateral movement between the parts and also slight longitudinal movement and aid in cushioning the road shocks between the parts.

While the invention has herein been shown and described in detail in a specific embodiment thereof, it will be understood that changes and modifications may be made by those skilled in the art without departing from the main features of the invention, and such changes and modifications are intended to be covered in the appended claims.

What is claimed is:

1. In a brake arrangement, a wheel and axle assembly including journal boxes adjacent the ends thereof, a vehicle frame supported from said assembly, a brake rotor carried by said assembly, a brake stator in cooperative relation with said rotor and actuating means therefor, and a support for said stator and its actuating means comprising a transversely extending member rotatably supported from the frame and longitudinally extending arms adjacent the ends of said member, each of said arms having upper and lower forked extensions having arcuate bearing on the adjacent journal box. the arcuate bearing of the upper extension being arranged substantially above the axle of the assembly and the arcuate bearing of the lower extension engaging the adjacent journal box on one side of the vertical plane and below the horizontal plane, both through the axle, whereby the wheel and axle assembly may be dropped from the vehicle frame and the connection between it and the forked extensions automatically disengaged through mere rotation of the brake support about its pivotal support from the vehicle frame.

2. In a brake arrangement, a wheel and axle assembly including journal boxes adjacent the ends thereof each provided with an outside bearing, a vehicle frame supported from said assembly, a brake rotor carried by said assembly, a brake stator in cooperative relation with said rotor and actuating means therefor, and a support for said stator and its actuating means comprising a transversely extending member rotatably supported in a bearing from the frame and longitudinally extending arms adjacent the ends of said member, each of said arms having upper and lower forked extensions, the upper being longer than the lower and each having an arcuate bearing engaging the outside bearing on the adjacent journal box, the centers of said arcuate bearings being spaced substantially less than 180° apart, and at least one of said bearings between the brake support and the vehicle frame and between the brake support and the wheel and axle assembly being provided with yielding means to cushion the relative longitudinal movements between the wheel and axle assembly and the vehicle frame.

3. In a brake arrangement, a wheel and axle assembly including journal boxes adjacent the ends thereof each provided with an outside bearing, a vehicle frame supported from said assembly, a brake rotor carried by said assembly, a brake stator in cooperative relation with said rotor and actuating means therefor, and a brake support for said stator and its actuating means, comprising a transversely extending member rotatably supported in a bearing from the frame and longitudinally extending arms having upper and lower forked extensions, the upper being longer than the lower and each having an arcuate bearing engaging the outside bearing on the adjacent journal box, the centers of said arcuate bearings being spaced substantially less than 180° apart, each of said bearings between the forked arms and the associated journal boxes and between the transverse member and the vehicle frame being provided with yielding means to cushion the road shocks and the relative movements between the wheel and axle assembly and the vehicle frame.

4. In a brake arrangement, a wheel and axle assembly including journal boxes adjacent the ends thereof, a vehicle frame supported from said assembly, a brake rotor carried by said assembly, a brake stator and actuating means therefor, and a support for said stator and its actuating means comprising a transversely extending portion rotatably supported from the vehicle frame and longitudinally extending arms from adjacent the ends of said portion, each of said arms having upper and lower forked extensions, the upper being longer than the lower and each extension carrying adjacent its end an arcuate bearing part engaging a cooperating bearing part on the adjacent journal box, the spacing of the bearing carrying ends of said extensions being such that they are automatically disengaged from the cooperating bearing parts on the journal boxes upon dropping of the wheel and axle assembly from the vehicle frame.

5. In a brake arrangement, a wheel and axle assembly including journal boxes adjacent the ends thereof, a vehicle frame supported from said assembly, a brake stator and actuating means therefor, and a support for said stator and its actuating means comprising a transversely extending portion rotatably supported from the vehicle frame and longitudinally extending arms from adjacent the ends of said portion, each of said arms having upper and lower forked extensions providing arcuate bearing engagement with a cooperating bearing on the adjacent journal box, the spacing of the ends of arcuate bearing carrying extensions being such that they are automatically disengaged from cooperating bearing engagement with the cooperating bearings on the journal boxes upon dropping of the wheel and axle assembly from the vehicle frame.

6. In a brake arrangement, a wheel and axle assembly, a vehicle frame supported from said assembly, a brake stator and actuating means therefor, and a support for said stator and its actuating means comprising a transversely extending portion rotatable in a bearing supported from the vehicle frame, and longitudinally extending arms from adjacent the ends of said portion having pivotal connection with the respective ends of said assembly, which connection is adapted to be disrupted automatically by the dropping away of the wheel and axle assembly and the rotation of the support on its bearing on the vehicle frame.

7. In a brake arrangement, a wheel and axle assembly, a vehicle frame supported from said assembly, a brake stator and actuating means therefor, and a support for said stator and its actuating means comprising a transversely extending portion rotatable in a cushioned bearing supported from the vehicle frame and longitudinally extending arms from adjacent the ends of said portion having disruptable bearing connection with the respective ends of said assembly, which connection is adapted to be disrupted automatically by the dropping away of the wheel and axle assembly and the rotation of the support on its bearing on the vehicle frame.

8. In a brake arrangement, a wheel and axle assembly, a vehicle frame supported from said assembly, a brake stator and actuating means therefor, and a support for said stator and its actuating means comprising a transversely extending portion rotatable in a bearing supported from the vehicle frame and longitudinally extending arms having disruptable bearing connection with the respective ends of said assembly, which connection is adapted to be automatically disrupted by the dropping away of the wheel and axle assembly and the rotation of the support on its bearing on the vehicle frame, said bearing supported from the frame being cushioned by a rubber annulus yieldingly resisting relative vertical, longitudinal, and lateral movements between said support and said frame but imposing no appreciable resistance to the rotary movement of said support.

CAROLUS L. EKSERGIAN.